United States Patent [19]
Grover et al.

[11] 3,994,778
[45] Nov. 30, 1976

[54] LIQUID METAL HYDROGEN BARRIERS

[75] Inventors: George M. Grover; Thurman G. Frank; Edward S. Keddy, all of Los Alamos, N. Mex.

[73] Assignee: The United States of America as represented by the United States Energy Research and Development Administration, Washington, D.C.

[22] Filed: July 15, 1971

[21] Appl. No.: 165,833

[52] U.S. Cl. .................................. 176/71; 176/68; 176/72
[51] Int. Cl.² .......................................... G21C 3/16
[58] Field of Search .................. 176/68, 71, 72, 92, 176/42, 38

[56] References Cited
UNITED STATES PATENTS

| | | | |
|---|---|---|---|
| 3,115,446 | 12/1963 | Finniston | 176/72 |
| 3,141,830 | 7/1964 | Klepffer et al. | 176/68 |
| 3,145,150 | 8/1964 | Gylff | 176/72 X |
| 3,170,847 | 2/1965 | Dudek et al. | 176;76/71 |
| 3,304,235 | 2/1967 | Granata et al. | 176/82 |
| 3,342,692 | 9/1967 | Bourrasse et al. | 176/69 |
| 3,347,749 | 10/1967 | Jordan | 176/73 X |
| 3,354,043 | 11/1967 | Boettcher | 176/72 |

FOREIGN PATENTS OR APPLICATIONS 853,750   11/1960   United Kingdom................ 176/71

OTHER PUBLICATIONS

Freiman et al, Nuclear Science Abstracts, vol. 11, No. 5307, "The Retardation of the Electrodiffusion of Hydrogen . . . ".

Primary Examiner—Harvey E. Behrend
Attorney, Agent, or Firm—Dean E. Carlson; Edward C. Walterscheid

[57] ABSTRACT

Hydrogen barriers which comprise liquid metals in which the solubility of hydrogen is low and which have good thermal conductivities at operating temperatures of interest. Such barriers are useful in nuclear fuel elements containing a metal hydride moderator which has a substantial hydrogen dissociation pressure at reactor operating temperatures.

2 Claims, 3 Drawing Figures

LIQUID METAL HYDROGEN BARRIERS

BACKGROUND OF THE INVENTION

The invention described herein was made in the course of, or under, a contract with the U.S. ATOMIC ENERGY COMMISSION. It relates to a barrier for inhibiting hydrogen diffusion from a nuclear fuel element containing a metal hydride moderator and operating at temperatures at which a substantial hydrogen dissociation pressure exists. More specifically, it relates to a hydrogen barrier consisting of a liquid metal such as liquid lead.

Zirconium hydride, which has many desirable features as a moderating material for use in SNAP space reactor systems, has the serious disadvantage of producing substantial hydrogen dissociation pressure at the cooling temperatures (600° to 800° C) normally used with SNAP reactors. Standard cladding materials such as iron or nickel alloys are relatively transparent to hydrogen at these temperatures so that a barrier is required to prevent a serious loss of hydrogen over a period of time. Such a loss of hydrogen can significantly affect the neutronics within the reactor system.

In searching for appropriate barrier materials, it is evident that one must select materials in which the permeability of hydrogen is low, preferably as near zero as possible. This represents a formidable problem especially at higher temperatures. In addition, containment of hydride moderating material requires that the thermal conductivity of a barrier material be as high as possible since heat is generated within the moderator by neutrons and gamma rays. If the moderator also contains dispersed fissile fuel, as it does in the SNAP-8 reactors, heat is also produced by fissions.

It is known in the art that, insofar as SNAP reactor systems are concerned, a thin ceramic layer applied to the inner wall of the cladding will effectively reduce hydrogen leakage to tolerable rates. However, these ceramic layers have certain serious disadvantages in that they are difficult to apply, they are stable only on the inside surfaces of tubes, and they are subject to cracking damage from hydride swelling, shock, radiation, or if the fuel element bows excessively.

SUMMARY OF THE INVENTION

We have found that liquid metals selected from the class consisting of lead, bismuth, zinc, cadmium, indium, and thallium have very low solubility for hydrogen and consequently low hydrogen diffusion rates and good (> 0.01 cal/sec cm$^2$ ° C) thermal conductivities at temperatures in excess of 600° C. They are therefore suited to serve as hydrogen barriers for fuel elements in SNAP-type reactor systems. Because of its favorable neutron cross section and compatability with SNAP fuels, liquid lead is particularly adaptable for this purpose.

Liquid metal hydrogen barriers have the following advantages over the ceramic barriers now in use in the various SNAP reactors: (1) reactor coolant temperatures and lifetimes may be significantly increased due, in part, to the elimination of the temperature drop through the conventional hydrogen gap that exists between ceramic barriers and the moderator; (2) liquid metal barriers are not subject to cracking damage from hydride swelling, shock, or radiation; (3) the barrier and the hydride are less likely to be subjected to damage because of vibration during launch operations; and (4) liquid metal barriers are applicable to other geometric shapes than the interiors of cylinders.

The liquid metal barrier may be held in place between the cladding and the moderator by means of a metal wick separated from the cladding by wire wrapping. Alternatively, no wick or wire wrapping need be used, and the space between the cladding and the moderator may be completely filled with the liquid metal. Since there must be void to accommodate the expansivity of the liquid and change of volume with change of solid-to-liquid phase, the wick can be designed to locate this void in an interior position, i.e., not adjacent to the can wall. The wick accomplishes this even in the absence of gravitational forces such as in space application. In some applications, gravity will locate the void properly.

DETAILED DESCRIPTION OF THE INVENTION

If a metal is to be useful as a hydrogen barrier in the liquid state, an obvious prerequisite is that it have a melting point sufficiently low that it is liquid at the operating temperatures of interest. It is desirable that it also have a high thermal conductivity at these temperatures. More importantly, the solubility of hydrogen in the metal must be low. There is no known case of a gas diffusing through a metal in which it is not soluble. Moreover, with a liquid metal at temperatures of interest, i.e., 600° to 800° C, the solubility of hydrogen in the metal largely controls the rate at which the hydrogen diffuses or permeates through the metal. In addition, it is essential that the liquid metal have a neutron cross section such that neutrons are not preferentially absorbed to any great extent, thus substantially degrading the neutron density within the fuel element. Finally, it is necessary that the liquid metal not dissolve the fissile material from the fuel or otherwise adversely affect the fuel over long operating periods. Metals which can to varying degrees fulfill these requirements are listed in Table I.

TABLE I

| Material | Microscopic Thermal Neutron Cross Section (barns) | Macroscopic Thermal Neutron Cross Section (cm$^{-1}$) | Melting Point (°C) | Thermal Conductivity (cal/sec-cm°C) |
|---|---|---|---|---|
| Lead | 0.151 | 0.005 | 327 | 0.083 (25°C) |
| Bismuth | 0.028 | 0.001 | 271 | 0.02 (20°C) |

TABLE I-continued

| Material | Microscopic Thermal Neutron Cross Section (barns) | Macroscopic Thermal Neutron Cross Section (cm$^{-1}$) | Melting Point (°C) | Thermal Conductivity (cal/sec-cm°C) |
| --- | --- | --- | --- | --- |
| Zinc | 0.94 | 0.062 | 419 | 0.263 (25°C) |
| Cadmium | 2260 | 104 | 321 | 0.105 (358°C) |
| Indium | 168 | 6.42 | 156 | 0.057 |
| Thallium | 2.9 | 0.101 | 302 | 0.093 |

The hydrogen solubilities in these metals are so low that the literature is not in much agreement. Generally, the values are believed to be lower than about 0.01 cc (STP) per 100 g of metal. As can be seen from Table I, liquid lead has the most desirable combination of characteristics for use as a hydrogen barrier in SNAP reactor systems.

Figure 1:
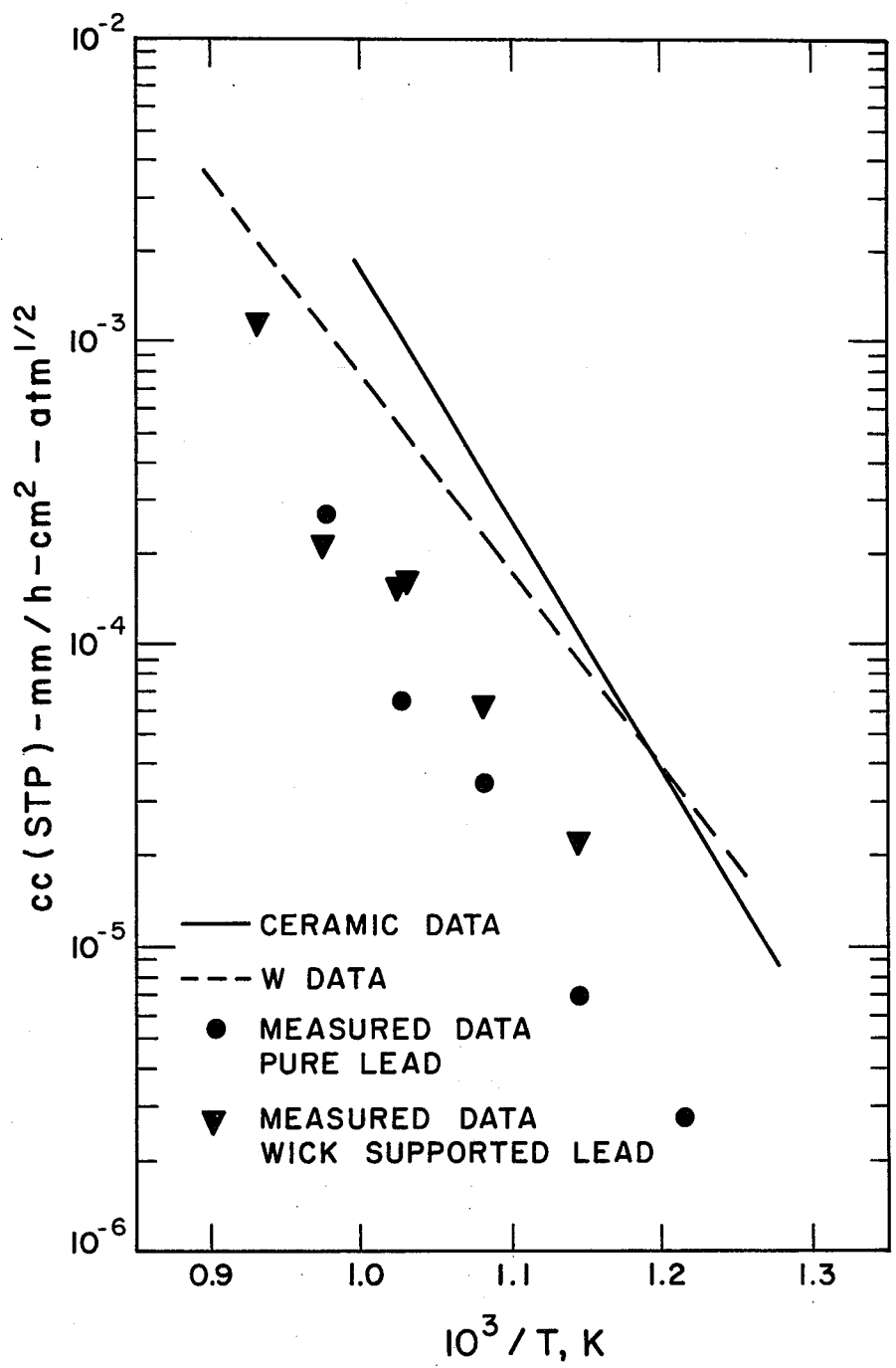
FIG. 1 shows the variation with temperature of the hydrogen diffusion rate through barriers consisting of ceramic, tungsten, wick-supported liquid lead, and unsupported liquid lead.

The variation in hydrogen diffusion rate with temperature is given in FIG. 1 for barriers consisting of tungsten, a ceramic of the type used in SNAP reactor systems, liquid lead supported with a wick, and liquid lead without a wick. Diffusion rates for tungsten are included in FIG. 1 because tungsten has the lowest hydrogen diffusion rate of any of the solid metallic materials that have been considered for use as a hydrogen barrier. The diffusion data for tungsten are taken from the report "Permeation of Hydrogen Through Metals," NAA-SR-10462 (July 25, 1965), available from the National Technical Information Service, U.S. Dept. of Commerce, Springfield, Va. 22151. The data given for the ceramic barrier are those predicted according to the relationship $$\frac{cc\ (STP)}{cm^2-h} = P^{\frac{1}{2}}\ exp\ (-12760/T) + 465\ P\ exp\ (-24200/T)$$

where P is hydrogen pressure and T is cladding temperature. The curves for liquid lead are derived from experimental data taken with the experimental assemblies shown in FIGS. 2 and 3.

Figure 2:
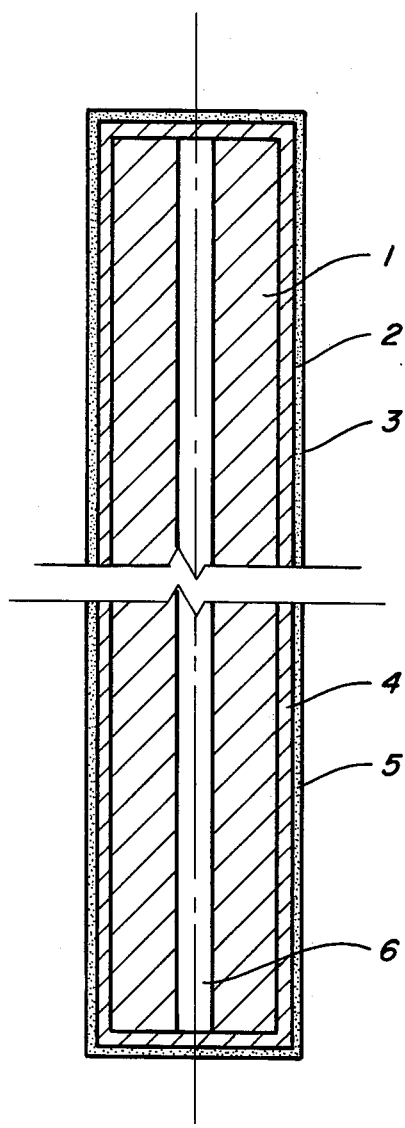
FIG. 2 is a test assembly useful for the determination of hydrogen diffusion rates through wick-supported liquid metal barriers which simulates a nuclear fuel element.

FIG. 2 shows a test assembly useful for ascertaining hydrogen permeability through a liquid metal barrier supported in a desired configuration by means of a metal wick. The outer envelope is a metal can 3 representative of the metal cladding of a fuel element. Can 3 encloses a cylinder 1 of a material which has a hydrogen dissociation pressure at temperatures of interest. Cylinder 1 may be a pure moderator such as zirconium hydride or it may be a nuclear fuel such as the SNAP-8 fuel which consists of ZrH$_{1.175}$ loaded with 10 weight percent of uranium. Surrounding cylinder 1 and in contact with it is a metal wick 2. Typically wick 2 is a wire screen having an appropriate mesh size dependent on the liquid metal barrier being tested. However, wick 2 is not limited to screens but may have any wick-like configuration that will suitably retain the liquid metal within its interstices or pores. Wick 2 is separated from can 3 by wire spacers 4. These spacers may take the form of wire wrapped around wick 2. A central void 6 running the length of cylinder 1 serves as a liquid metal reservoir. Depending upon the reactor design, fuel elements may or may not have this central void. Rather, liquid metal might be stored in a reservoir at one or both ends of the elements in the manner shown by reservoir 15 of FIG. 3. The liquid metal barrier is produced by filling void 6, wick 2, and the space 5 between wick 2 and can 3 with an appropriate liquid metal. It is essential that the material of wick 2 and envelope 3 be a type that can be suitably wetted by the liquid metal. Thus, for example, when liquid lead is used as the barrier, wick 2 and can 3 cannot be made of stainless steel because of mass transfer and poor wetting. However, cans and wicks made of Nb or Nb-1 wt % Zr are readily wetted by liquid lead.

Figure 3:
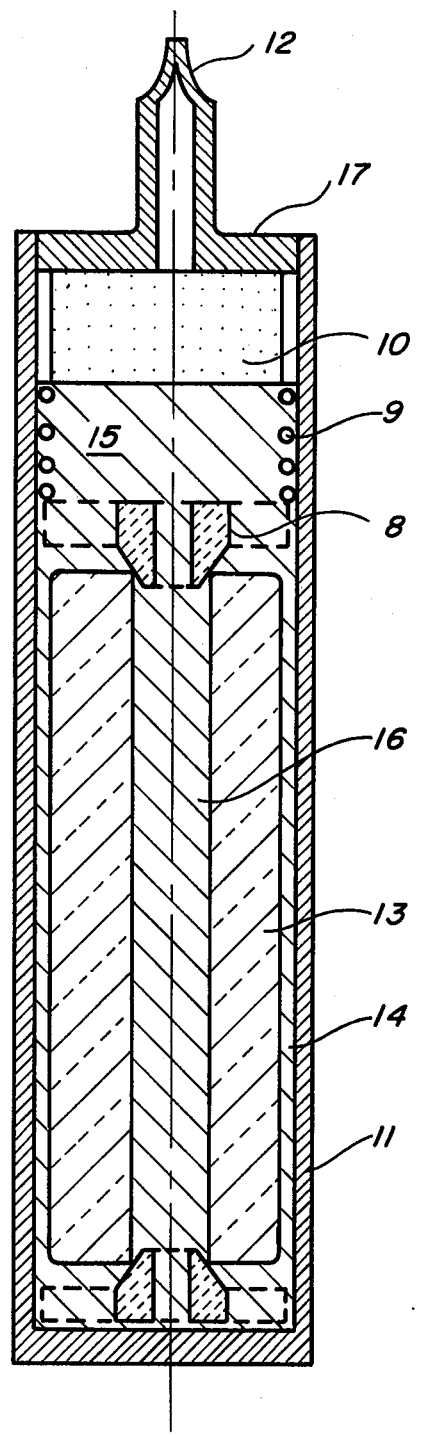
FIG. 3 is a test assembly useful for the determination of hydrogen diffusion rates through unsupported liquid metal barriers which simulates a nuclear fuel element.

FIG. 3 shows a test assembly useful for ascertaining hydrogen permeability through a liquid metal barrier unsupported by a metal wick. A cylinder 13 consisting of a material having a hydrogen dissociation pressure at temperatures of interest is centered axially and held in place within can 11 by means of support cones 8 which extend a short distance into central void 16 in cylinder 13. The support cones with cylinder 13 between them are held firmly against the bottom of can 11 by spring 9. An appropriate metal is melted into can 11 under vacuum, filling central void 16 and space 14 around cylinder 13 and partially filling reservoir 15. End cap 17 is then inserted and welded in place. Finally, the remainder of reservoir 15 is back-filled through tube 12 with an inert gas such as argon at 1 atmosphere and the assembly sealed by pinching off tube 12.

In determinations of hydrogen diffusion rates, the test assemblies of FIGS. 2 and 3 containing a liquid metal barrier are placed in a vacuum system consisting of a quartz tube, a vac-ion pump, and a McCloud pressure gage and heated under vacuum to the desired temperature. Surface cladding temperatures, i.e., temperatures of the outer surface of the metal cans of the test assemblies, are monitored by means of a continuously recording infrared pyrometer.

Hydrogen diffusion rates are determined at specified temperatures as follows. First a measurement of background gas accumulation is made for the static system at ambient temperature. The test assembly is then heated to the desired temperature in a dynamic vacuum. When the desired temperature is reached, the vacuum pump is shut off, and the evolved gas allowed to accumulate at temperature in the static system for the duration of the test period. At the end of the test period the pressure of the evolved gas is measured. Since the volume of the system is accurately known, the hydrogen diffusion rates can readily be calculated on the basis of the pressure measurements.

Hydrogen diffusion rates from a Nb-1 wt % Zr-clad, wick-supported, liquid-lead hydrogen barrier test assembly similar to that shown in FIG. 2 are given in Table II.

TABLE II

| Assembly Temp. (°C) | Length of Test (h) | Pressure Increase (Torr/h) | Background Pressure Increase (Torr/h) | Diffusion Rate (H$_2$/cm$^2$-h)* |
| --- | --- | --- | --- | --- |
| 20 | 17 | 0.00010 | — | — |
| 600 | 17 | 0.00053 | 0.00043 | 3.06 × 10$^{14}$ |
| 650 | 4 | 0.00350 | 0.00340 | 2.40 × 10$^{15}$ |
| 695 | 19 | 0.00947 | 0.00937 | 6.66 × 10$^{15}$ |

TABLE II-continued

| Assembly Temp. (°C) | Length of Test (h) | Pressure Increase (Torr/h) | Background Pressure Increase (Torr/h) | Diffusion Rate ($H_2/cm^2$-h)* |
|---|---|---|---|---|
| 700 | 5.5 | 0.00964 | 0.00954 | $6.81 \times 10^{15}$ |
| 750 | 5 | 0.01640 | 0.01630 | $1.45 \times 10^{16}$ |
| 800 | 2 | 0.1800 | 0.1799 | $1.28 \times 10^{17}$ |

*Hydrogen diffusion rate through barrier and cladding.

Similar data from a Nb-1 wt % Zr-clad, unsupported, liquid-lead hydrogen barrier test assembly similar to that shown in FIG. 3 are given in Table III.

TABLE III

| Assembly Temp. (°C) | Length of Test (h) | Pressure Increase (Torr/h) | Diffusion Rate ($H_2/cm^2$-h) |
|---|---|---|---|
| 550 | 5 | $1.5 \times 10^{-5}$ | $1.78 \times 10^{13}$ |
| 600 | 15.1 | $7.4 \times 10^{-5}$ | $8.77 \times 10^{13}$ |
| 650 | 5.1 | $7.0 \times 10^{-4}$ | $8.28 \times 10^{14}$ |
| 700 | 145.1 | $2.26 \times 10^{-3}$ | $2.68 \times 10^{15}$ |
| 750 | 21.0 | $15.88 \times 10^{-3}$ | $1.81 \times 10^{16}$ |

It can readily be seen that both wick-supported and unsupported liquid-lead hydrogen barriers are superior to solid tungsten barriers, with hydrogen diffusion rates in an unsupported liquid-lead barrier almost an order of magnitude below those in a tungsten barrier. The difference in diffusion rates in supported and unsupported liquid-lead hydrogen barriers is thought to be due to the effect of the metal screen on the diffusion coefficient of hydrogen in lead and to possible failure to completely fill the metal wick with lead. Therefore in cylindrical and other configurations wherein it is not necessary to support the liquid-metal hydrogen barrier, an unsupported barrier is believed preferable to a wick-supported barrier.

For an unsupported, liquid-metal hydrogen barrier, concentricity of the barrier thickness is relatively unimportant. It can readily be shown, for example, that in an extreme case wherein the maximum barrier thickness is three times the minimum thickness, the diffusion rate would be only 16% higher than that through a perfectly concentric barrier.

DESCRIPTION OF THE PREFERRED EMBODIMENTS

EXAMPLE I

This example indicates the manner in which a wick-supported liquid metal may be used to provide an effective hydrogen barrier. The test assembly shown in FIG. 2 was constructed with the materials and dimensions given in Table IV.

TABLE IV

| Designation in FIG. 2 | Material | Test-Assembly Dimensions (in.) | |
|---|---|---|---|
| | | Outside Diameter | Length |
| Central Void 6 | — | 0.187 | 2.76 |
| Cylinder 1 | $ZrH_{1.787}$ | 0.472 | 2.76 |
| Wick 2 | Nb-1 wt % Zr | 0.511 | 2.80 |
| Wire Spacers 4 | Tungsten | 0.531 | 3.77 |
| Can 3 | Nb-1 wt % Zr | 0.625 | 4.14 |

This assembly was then filled with lead by melting lead into the completed assembly from an open end in vacuum. No difficulties were encountered in obtaining a uniform layer of lead completely enclosing the ZrH cylinder. The lead was then zone refined to transport impurities to that part of the lead near the open end of the assembly. The impure portion of the lead was then removed by machining and the open end closed by welding in an end cap. The assembly was then heated in a horizontal position to desired temperatures in vacuum and the hydrogen diffusion rates determined according to the procedure herein disclosed. The diffusion rates are given in Table II and plotted in FIG. 1.

EXAMPLE II

This example indicates the manner in which an unsupported liquid metal may be used to provide an effective hydrogen barrier. The test assembly shown in FIG. 3 was constructed with the materials and dimensions given in Table V.

Table V

| Designation in FIG. 3 | Material | Test Assembly Dimensions (in.) | |
|---|---|---|---|
| | | Outside Diameter | Length |
| Cylinder 13 | SNAP-8 fuel | 0.529 | 2.496 |
| Can 11 | Nb-1 wt % Zr | 0.625 | 4.870 |
| Support cone 8 | $Al_2O_3$ | 0.562 | 0.400 |
| Void 16 | | 0.187 | 2.496 |
| Spring 9 | Tungsten | 0.562 | 1.0 |
| Barrier region 14 | Lead | 0.562 | 2.496 |
| Liquid metal reservoir 15 | Lead | 0.562 | 1.0 |
| End cap 17 | Nb-1 wt % Zr | 0.562 | 0.035 |
| Tube 12 | Nb-1 wt % Zr | 0.250 | 2.0 |

This assembly was then filled with lead by melting lead into the completed assembly from an open end in vacuum. The end cap was then welded in, the space above the lead back-filled with 1 atm of argon, and the assembly sealed by pinching off the tube in the end cap. The assembly was then heated to desired temperatures in vacuum and the hydrogen diffusion rates determined according to the procedure disclosed herein. The diffusion rates are given in Table III and plotted in FIG. 1. Diffusion rates at temperatures less than 550° C were so low that they were indistinguishable from background leakage. The 145.1-hour test was run after the assembly had been heated to 750° C for 5 hours to outgas reasonably well the metal parts in the assembly. The measured pressure increase at 750° C may therefore include some contribution from additional outgassing. Because of differential thermal expansion of the components of the assembly, the thickness of lead surrounding the fuel varies according to the temperature at which hydrogen diffusion rates are being measured. At 600° C the thickness of the liquid-lead barrier between the inner wall of the can and the outer wall of the fuel cylinder is 0.0165 inch.

We claim:

1. A nuclear fuel element for operation at between 600° and 800° C, said element having an inner core of fissile fuel material intermixed with a metal hydride moderating material and an outer cladding material, and having between said inner core and said outer cladding material a hydrogen diffusion barrier comprising a metal selected from the class consisting of lead, bismuth, zinc, and thallium, wherein said hydrogen diffusion barrier metal is in a liquid state and is supported by a wick at the operating temperature of the nuclear fuel element and the solubility of hydrogen less than 0.01 cc (STP) per 100 g of metal and the thermal conductivity is greater than 0.01 cal/sec-cm-° C at said operating temperature said inner core being free of said barrier metal, said liquid barrier metal being compatible with said cladding material, said fuel material, and said metal hydride material.

2. The nuclear fuel element of claim 1 wherein the cladding is selected from the class consisting of niobium and Nb-1 wt % Zr.

* * * * *